United States Patent [19]

Ishida et al.

[11] Patent Number: 5,603,828
[45] Date of Patent: Feb. 18, 1997

[54] FILTER SCREEN CHANGER FOR RESIN EXTRUDER

[75] Inventors: Yasuhiko Ishida, Hiroshima; Tomomi Kato, Mie, both of Japan

[73] Assignee: The Japan Steel Works, Ltd., Tokyo, Japan

[21] Appl. No.: 531,080

[22] Filed: Sep. 20, 1995

[30] Foreign Application Priority Data

Sep. 20, 1994 [JP] Japan .................................. 6-225238

[51] Int. Cl.⁶ ................................................ B01D 29/62
[52] U.S. Cl. .................... 210/239; 210/340; 210/357; 210/359; 210/447; 425/199
[58] Field of Search ................................ 425/199; 210/239, 210/240, 340, 357, 359, 447

[56] References Cited

U.S. PATENT DOCUMENTS

| | | | |
|---|---|---|---|
| 3,684,419 | 8/1972 | Voight | 425/192 |
| 3,983,038 | 9/1976 | Heston | 210/447 |
| 4,025,434 | 5/1977 | Mladota | 210/447 |
| 4,814,186 | 3/1989 | Trott | 425/199 |
| 5,122,286 | 6/1992 | Kreyenborg et al. | 425/197 |

OTHER PUBLICATIONS

Kunststoffberater, vol. 37, No. 5, May 1992, Isernhagen de, pp. 42–45.

*Primary Examiner*—W. L. Walker
*Attorney, Agent, or Firm*—Sughrue, Mion, Zinn, Macpeak & Seas

[57] ABSTRACT

A screen changer has not only the conventional slide bars with material injection channels and first air withdrawing channels, but also second air withdrawing channels, as well as material withdrawing channels when the slide bars are in an intermediate position where the filter portions provided through those slide bars in a direction normal to the axis are sealed and isolated within through-holes in the housing; said second air withdrawing channels communicate the topmost parts of the downstream compartments with the outside of the housing and are provided such that after penetrating through the slide bars, they extend along the outer surfaces of those slide bars; said material withdrawing channels are provided through the housing such that they communicate the exit ends of the downstream compartments with the outside of the housing.

1 Claim, 4 Drawing Sheets

FILTER SCREEN CHANGER FOR RESIN EXTRUDER

BACKGROUND OF THE INVENTION

1. Field of the Invention

The present invention relates to a filter apparatus for use with a resin material extruder to filter dust and other foreign objects from a molten resin material. More particularly, the invention relates to a screen changer, or a device for changing the screens in the filter apparatus.

2. Related Art

Resin materials which are being melted and kneaded in and extruded from extruders are in many cases contaminated by dust and other solid unmeltable matter. In order to remove such contaminants, extruders are equipped with a filter apparatus which has screens provided in the passageway of the molten material from the extruder such that any solid contaminants are filtered off to produce a clean melt which is supplied into a die and other subsequent devices and components. However, as the filter is used, the contaminants removed by filtration collect on the surface of the screens on the upstream side and reduce the effective area of filtration such that the resistance to the flow of the molten material is increased, thereby lowering the operating efficiency of the extruder. To avoid this problem, the screens are cleaned to remove the collecting contaminants or replaced by new screens either periodically or as the need arises.

A representative type of the conventional screen changers is illustrated in FIGS. 4 to 11. The screen changer 1 in FIG. 4 comprises a housing 2 with two parallel through-holes 23 and 24 having a circular cross section normal to its axis, two cylindrical slide bars 3 and 4 that are fitted into said through-holes 23 and 24, respectively, in a liquid-tight and reciprocating manner, and hydraulic cylinders 5 and 6 that are fixed to said housing 2 via a plurality of tie-bars 8, nuts 8a and a clamping plate 7 and which have piston rods 5a and 6a connected to said slide bars 3 and 4, respectively.

As shown in FIG. 5, said housing 2 has a through-channel 11 formed in a direction perpendicular to said through-holes 23 and 24, said through-channel 11 has an inflow channel 11a which separates into two branches and the two branches, after crossing the respective through-holes 23 and 24, meet part of the way in an outflow channel 11b.

Each of the slide bars 3 and 4 has a channel portion and a filter portion that each communicate with said through-channel 11 and which penetrate it in a direction normal to its axis. Said channel and filter portions are composed of upstream compartments 31 and 41, the screen 9, a breaker plate 10 and downstream compartments 32 and 42. The upstream compartments 31 and 41 are formed such that openings of sufficiently large cross sections are provided to increase the effective area of filtration, or the two-dimensional area of the screen 9. On the other hand, the downstream compartments 32 and 42 are formed such that the size of the cross sections of their openings will decrease smoothly in a downward direction to insure that the large cross sections of the openings just after the breaker plate 10 will match the small cross sections of the openings in the outflow channel 11b. The through-holes 23 and 24 formed in the housing 2 have sufficient lengths to seal the channel portions of the slide bars 3 and 4, respectively, when they reciprocate.

In FIGS. 4 and 5, the first slide bar 3 is shown to be in such a state that filtration is possible, namely, the through-channel 11 in the housing 2 is in communication with the filter portion of the first slide bar 3, and the second slide bar 4 is shown to be in a such that state the screen 9 can be cleaned or replaced, namely, the filter portion of the second slide bar 4 is exposed to the outside of the housing 2. To operate the extruder, the screen changer 1 installed in it is first adapted to have both slide bars 3 and 4 positioned in the same manner as the first slide bar 3 is shown in FIG. 4 (i.e., they are positioned in such a state that filtration is possible) and, thereafter, a molten resin material is filtered.

Stated more specifically, the molten material being delivered from the extruder enters the housing 2 through the inflow channel 11a and separates in two flows, which are filtered in the filter portions provided in the two slide bars 3 and 4 and thereafter meet in the outflow channel 11b to be discharged from the housing 2. As the extruder is operated continuously, the rejected contaminants collect on the sides of the screens 9 which face the upstream compartments 31 and 41 and the resistance to the flow of the molten material increases so much as to lower the operating efficiency of the extruder. Hence, it becomes necessary to reduce the flow resistance of the molten material by cleaning the screens 9 or replacing them with new ones. In order to perform the necessary cleaning or replacing step without shutting down the extruder, filtration is accomplished with only one of the two screens while the other screen is cleaned or replaced and, thereafter, the cleaned or substituted screen is used for filtration while the first mentioned screen is cleaned or replaced.

The slide bar 3 or 4 in which the screen 9 is to be cleaned or replaced is pushed from the state of the first slide bar 3 (see FIG. 4) to the state of the second slide bar 4 (also see FIG. 4) by means of the hydraulic cylinder 5 or 6 and, after the screen 9 is cleaned or replaced, the slide bar is pulled back to its initial state (i.e., the state of the first slide bar 3). This procedure is successively followed for the two slide bars 3 and 4 one at a time.

When the slide bars 3 and 4 are to be pushed in the process of cleaning or replacing the screens 9, either slide bar is pushed in one action. When they are to be pulled back, either slide bar makes a temporary stop so that its channel and filter portions are filled with the molten material to eliminate air and only thereafter is either slide bar pulled back to its initial state (i.e., where filtration is possible). The reason for adopting this procedure is as follows. When the screen 9 is cleaned or replaced with the filter portion being exposed to the outside of the housing 2, the channel and filter portions of slide bar 3 (or 4) are totally or partially emptied of the molten material and if such "empty" slide bar is pulled back to the filtrable state in one action, the air in the empty space is discharged as part of the molten material to be filtered and, when the air containing molten material is subsequently extruded through the die, the air will expand rapidly and produce broken strands. To prevent this problem, the entrapped air is eliminated before either slide bar is pulled back to the initial filtrable state. To insure that the channel and filter portions of both slide bars 3 and 4 are completely filled with the molten material, those slide bars are designed to have additional features as described below.

FIGS. 6 and 7 show the state where the second slide bar 4 has been pulled back to a position intermediate between the filtrable state and the cleanable or replaceable state such that the channel and filter portions of said second slide bar 4 are sealed and isolated within the through-hole 24 in the housing 2, and as shown, a material injection channel 43 which communicates the upstream compartment 41 of said filter portion with the inflow channel 11a in the housing, a first air withdrawing channel 44 which communicates the topmost part of the entrance end of the upstream compartment 41 to the outside of the housing 2, and a third air withdrawing channel 45 which communicates the topmost part of the exit end of the downstream compartment 42 of said filter portion to the outside of the housing 2 are provided axially in said intermediate position along the outer surface of the second slide bar 4. The first slide bar 3 is similarly provided with a material injection channel 33, a first air withdrawing channel 34 and a third air withdrawing channel 35.

As shown with the first slide bar 3 in FIG. 4, the tips of the material injection channel 33 (34), the first air withdrawing channel 34 (44) and the third air withdrawing channel 35 (45) are sealed within the through-hole 23 (24) in the housing 2 when the respective slide bar is in the filtrable state. When the second slide bar 4 is in the intermediate position shown in FIGS. 6 and 7, its channel and filter portions are emptied of air and filled with the molten material in the following manner.

FIGS. 8 to 11 show the sequence of events that occur in that part of the screen changer which is shown in FIG. 5. FIG. 8 shows the state of the channel and filter portions of the second slide bar 4 before it is pulled back to the intermediate position. As shown, the upstream compartment 41 of the slide bar 4 is empty or filled with nothing but air a1. The downstream compartment 42 has a molten material m2 remaining in the lower part (which is sometimes completely absent as a result of cleaning) and has an air portion a2 present in the upper part.

In FIG. 9, a molten material m1 flows gradually from the inflow channel 11a into the upstream compartment 41 via the material injection channel 43 (not shown) provided in an area closer to the viewer and as the upstream compartment 41 is progressively filled with the molten material m1, air a1 is pushed for displacement to the outside of the housing 2 via the first air withdrawing channel 44. The molten material m1 which continues to flow passes through the screen 9 and the breaker plate 10 to enter the downstream compartment 42 and as the latter is progressively filled with the molten material m1, air a2 is pushed to the outside of the housing 2 via the third air withdrawing channel 45.

In FIG. 10, the upstream compartment 41 is completely filled with the molten material m1 and the air a2 remaining at the corners in the topmost part of the downstream compartment 42 (see FIG. 9) is pushed out of said compartment by means of the viscosity of the molten materials m1 and m2 which completely fill said downstream compartment 42. The upstream compartment 41 and the downstream compartment 42 are known to be filled with the molten materials m1 and m2 by when molten material is discharged through the tips of the first and third air withdrawing channels 44 and 45 which communicate with the outside of the housing 2. In FIG. 11, the upstream and downstream compartments 41 and 42 are filled with the molten materials m1 and m2; that is, the channel and filter portions of the second slide bar 4 are completely filled with the molten material; thus, the second slide bar 4 has been pulled back to the filtrable state where the filter portion communicates with the inflow channel 11a and the outflow channel 11b in the housing 2. The above-described procedure allows the screens 9 to be cleaned or replaced without allowing air to be entrapped in the molten material.

Being constructed in the way described above, the conventional screen changer has suffered from various problems. First, if the molten material to be supplied has a viscosity lower than 3000 poises, the air at the corners in the topmost part of the downstream compartment shown in FIG. 9 is not completely displaced by the pushing action of the molten material but will often remain in that downstream compartment. Such residual air is sensitive to the slightest change in the flow conditions of the molten material and will abruptly be discharged as part of the molten material.

If a molten material having viscosity lower than 1000 poises flows into the upstream compartment via the material injection channel, the air in an empty space in the upstream compartment is entrapped by the molten material flowing into that space and may form tiny bubbles that are dispersed in the molten material. This means that even if the operator verifies that the channel and filter portions of either slide bar have been filled with the molten material (i.e., air has been displaced), the residual air will be discharged as part of the molten material after the slide bar is pulled back to the filtrable state. If the molten material containing air is extruded as a strand through a die, the transition from the high pressure in the extruder to a lower atmosphere occurs so rapidly that the hot and pressurized air in the molten material will burst as a result of sudden expansion, thereby causing broken strands to emerge from the die. A continuous strand emerging from the die is taken up by a granulator for granulation but if it breaks in the middle, the subsequent portion is discontinuous from the granulator and cannot be taken by the granulator. The subsequent portion of the broken strand not only fails to be taken up by the granulator, but broken strands will keep emerging from the die and, having nowhere to go, they will collect progressively until normal operation of the extruder is prevented.

If broken strands occur, the trouble must be quickly located so that it can be remedied promptly. However, this trouble-shooting procedure is very difficult to accomplish mechanically or automatically without a large amount of labor. What is more, the molten material is oxidized upon contact with air and the resulting "burn mark" will deteriorate the quality of the granulated product. Contamination of the molten material by air will potentially cause such inconveniences to occur every time the screen changer is used for screen cleaning or replacement, and this causes a reduction in the operating efficiency of the extruder and a reduction in the the yield of the product.

SUMMARY OF THE INVENTION

The present invention has been made under these circumstances and has as an object providing a screen changer that is adapted to insure that no air will be left in the channel and filter portions of either slide bar during screen cleaning or replacement.

The screen changer of the invention comprises a housing having a through-channel and through-holes-that cross said through-channel, and columnar slide bars that each have a filter portion communicable with said through-channel and which are inserted into the through-holes in said housing in a liquid-tight and reciprocating manner, such that a molten material enters said housing via an inflow channel to the through-channel and passes through the filter portions of said slide bars to come out of said housing via an outflow channel from the through-channel, and material injection channels which communicate the upstream compartments in said filter portions with said inflow channel, and first air withdrawing channels which communicate the topmost parts of the upstream compartments in said filter portions with the outside of said housing, provided along the outer surfaces of said slide bars, when the filter portions of said slide bars are sealed and isolated within the through-holes in said housing as a result of the movement of said slide bars. This screen changer also is provided with second air withdrawing channels that penetrate the topmost parts of the downstream compartments in the filter portions of said slide bars to reach the outer surfaces of said slide bars and which extend along the outer surfaces of the slide bars to communicate with the outside of said housing when said filter portions are sealed and isolated within the through-holes in said housing as a result of the movement of said slide bars.

In a preferred embodiment, the screen changer also has material withdrawing channels that are provided through said housing and that communicate the downstream compartments in the filter portions of said slide bars with the outside of said housing when said filter portions are sealed and isolated within the through-holes in said housing as a result of the movement of said slide bars.

The screen changer of the invention will operate in the following manner. When, after screen cleaning or replacement, a slide bar that has been occupied with air in spaces in its channel and filter portions is pulled back to its intermediate position (i.e., where its filter portion is sealed and isolated within a through-hole in the housing), a molten material enters the housing via an inflow channel to the through-channel and passes through the material injection channel to flow into the upstream compartment, thereby progressively filling spaces in the channel and filter portions of the slide bar; at the same time, the air occupying those spaces is displaced by being pushed through the first and second air withdrawing channels to come out of the housing. Since the first and second air withdrawing channels are provided to communicate with the topmost parts of the upstream and downstream compartments, respectively, the air occupying the channel and filter portions of slide bar will remain above the molten material being introduced into those portions and all of the air can be completely pushed out of those portions. The molten material which has filled the channel and filter portions of the slide bar will leak out of these portions via the first and second air withdrawing channels, indicating that the air has been completely displaced from those portions. If the molten material that has flowed into the upstream compartment when the slide bar has been pulled back to the intermediate positions contains tiny bubbles of air, the screen changer of the invention ensures that the air occupying the spaces in the channel and filter portions of the slide bar is completely pushed out of the housing via the first and second air withdrawing channels and, in addition, the molten material containing the air bubbles will also flow out of the housing via the material withdrawing channel. Since the material withdrawing channel is provided adjacent the exit end of the downstream compartment, all of the molten material in the channel and filter portions will flow out of the housing. The molten material containing air bubbles can be regarded as having flowed out completely if no more air bubbles are found to exist in the molten material flowing out of the material withdrawing channel.

DETAILED DESCRIPTION OF THE PREFERRED EMBODIMENTS

A preferred embodiment of the screen changer according to the invention will now be described in detail with reference to the accompanying drawings, in which the parts or components that are the same as or equivalent to those of the conventional art apparatus are identified by like numerals.

Figure 1:
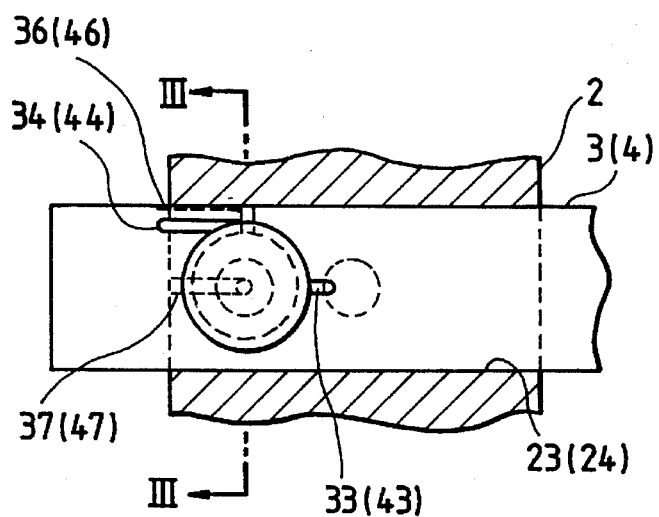
FIG. 1 is a front section of the essential part of the screen changer according to the invention.
Figure 2:
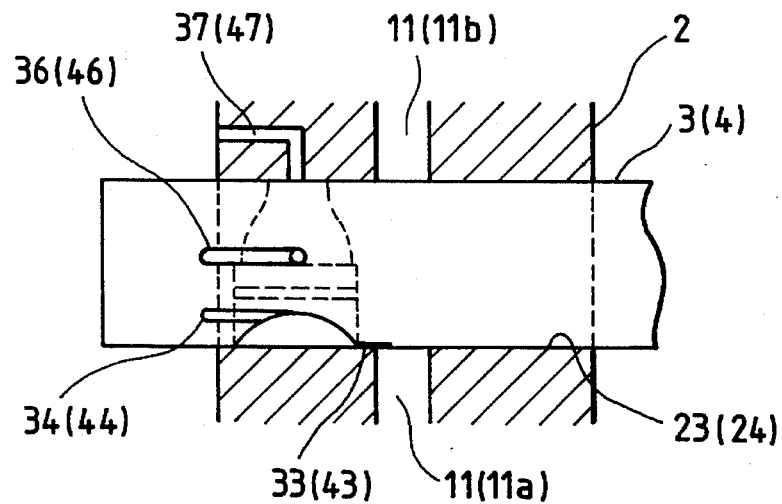
FIG. 2 is a horizontal section of FIG. 1.
Figure 3:
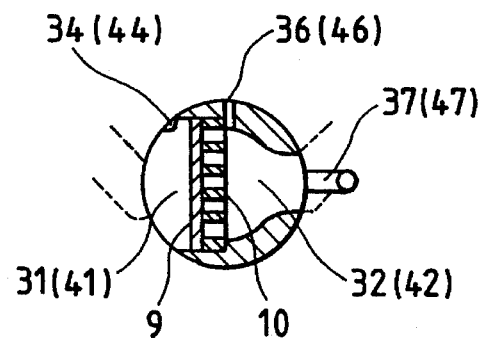
FIG. 3 is a section III—III of FIG. 1.

FIG. 1 is a front section of the essential part of the screen changer of the invention; FIG. 2 is a horizontal section of FIG. 1; and FIG. 3 is a section III—III of FIG. 1.

Figure 4:
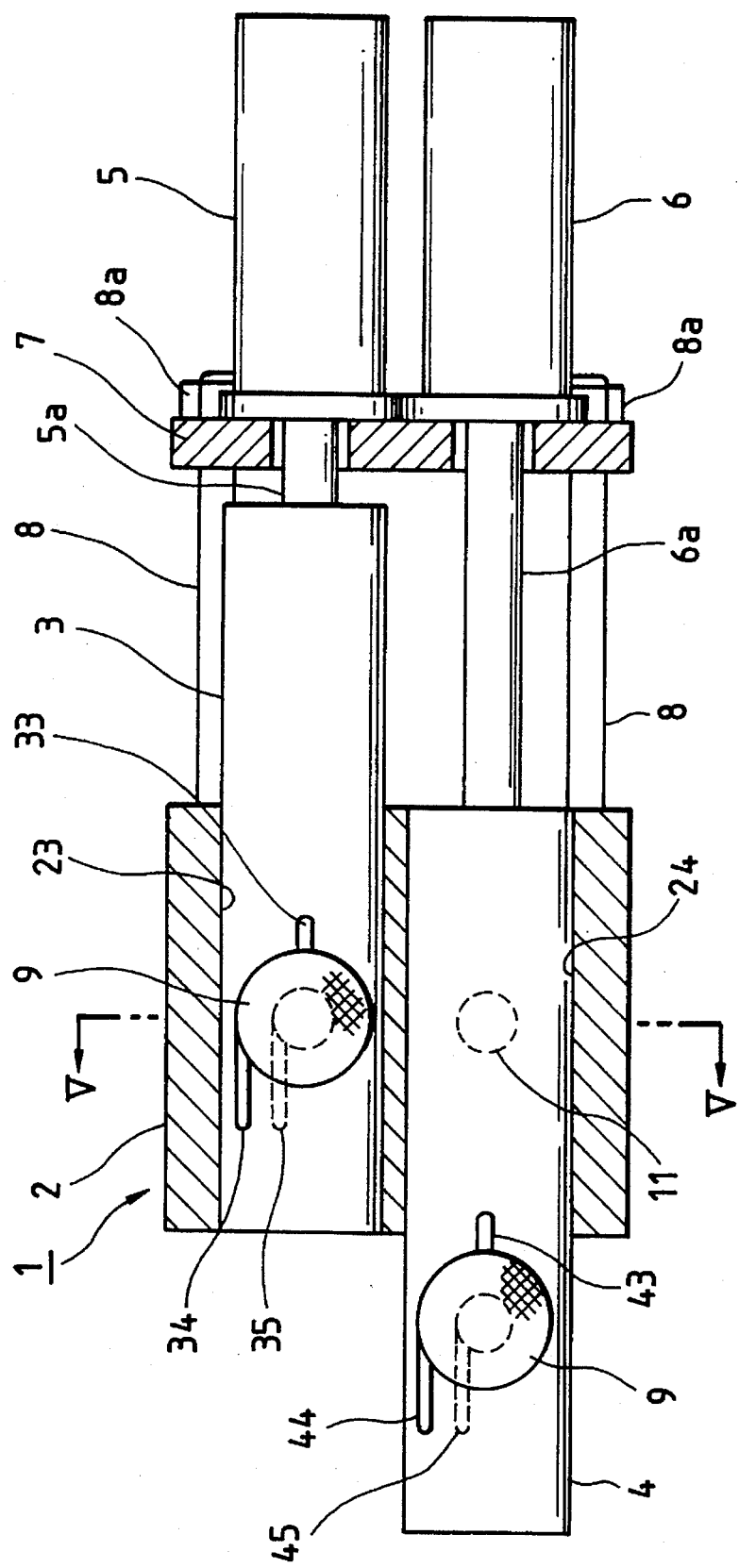
FIG. 4 is a front view showing in partial section the construction of a conventional screen changer.
Figure 5:
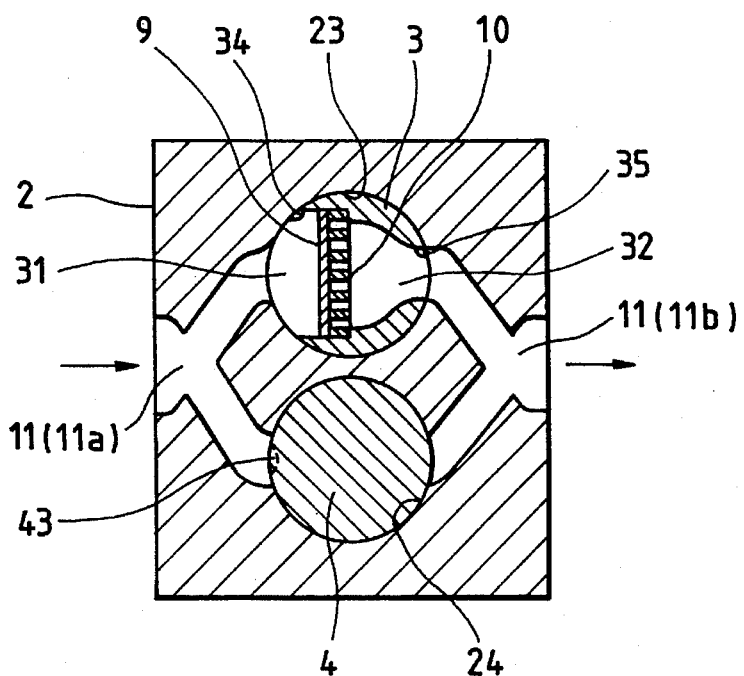
FIG. 5 is a section V—V of FIG. 4.

Note that the screen changer of the invention has generally the same construction as the conventional art apparatus shown in FIG. 4 which, therefore, is applicable to the invention. Thus, the screen changer generally indicated by 1 comprises a housing 2 in which two parallel through-holes 23 and 24 having a circular cross section normal to its axis, two cylindrical slide bars 3 and 4 that are fitted into said through-holes 23 and 24, respectively, in a liquid-tight and reciprocating manner, and hydraulic cylinders 5 and 6 that are fixed to said housing 2 via a plurality of tie-bars 8, nuts 8a and a clamping plate 7 and which have piston rods 5a and 6a connected to said slide bars 3 and 4, respectively. It should be noted here that the cross sections of the through-holes 23 and 24 in the housing 2 and those of the slide bars 3 and 4 normal to their axis are by no means limited to a circular shape but may be elliptical, rectangular or other polygonal shapes.

The housing 2 has a through channel 11 formed in a direction perpendicular to said through-holes 23 and 24; said through-channel 11 has an inflow channel 11a which separates into two branches and the two branches, after crossing the respective through-holes 23 and 24, meet in an outflow channel 11b. The slide bars 3 and 4 each have a channel and a filter portion formed therein that communicate with said through-channel 11 to penetrate it in a direction normal to its axis; the channel portion of the slide bar 3 (or 4) consists of an upstream compartment 31 (or 41) and a downstream compartment 32 (or 42), and the filter portion of each slide bar is composed of a screen 9 and a breaker plate 10.

The upstream compartments 31 and 41 are formed such that openings of sufficiently large cross sections are provided to increase the effective area of filtration, or the two-dimensional area of the screen 9. The downstream compartments 32 and 42 are formed such that the cross sections of the openings will decrease smoothly to insure that the large cross sections of the openings just after the breaker plate 10 will match the small cross sections of the outflow channel 11b. The through-holes 23 and 24 formed in the housing 2 have sufficient lengths to seal and isolate the channel and filter portions of the slide bars 3 and 4, respectively, when they reciprocate. Thus, the thickness of the housing 2 as measured from the through-channel 11 to its lateral side is greater than the width of the opening in the channel through each of the slide bars 3 and 4.

Figure 6:
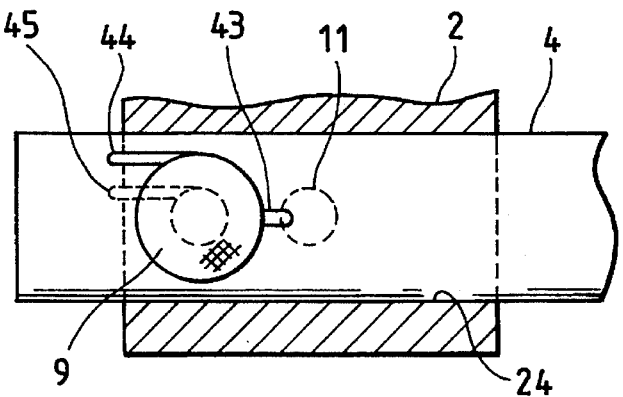
FIG. 6 is a partial view of FIG. 4, with the relative positions of components varied.
Figure 7:
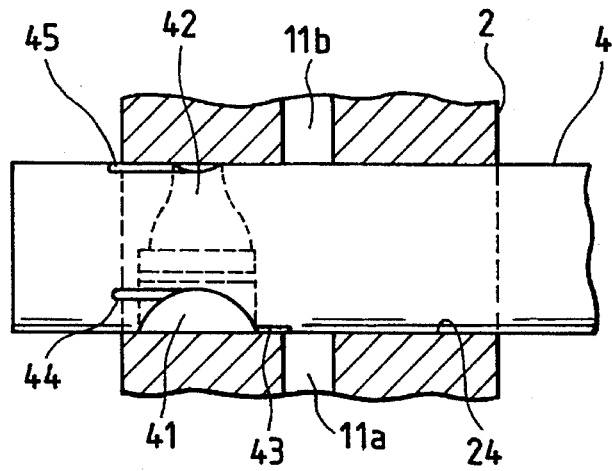
FIG. 7 is a plan view of FIG. 6.
Figure 8:
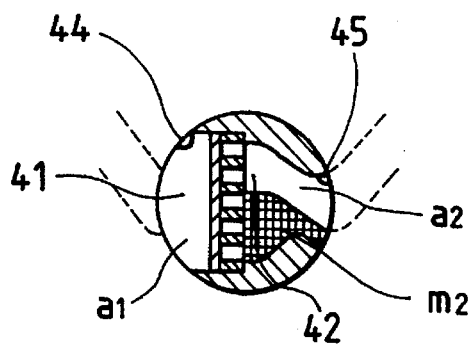
FIG. 8 shows a stage of the operation of a component shown in FIG. 5.
Figure 9:
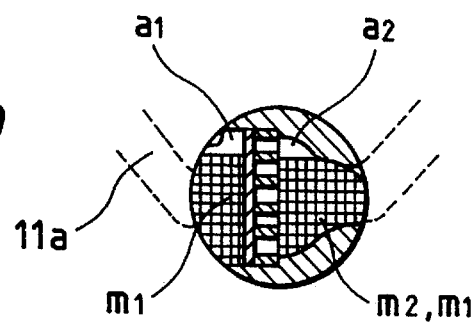
FIG. 9 shows the next stage of the operation of the same component shown in FIG. 5.
Figure 10:
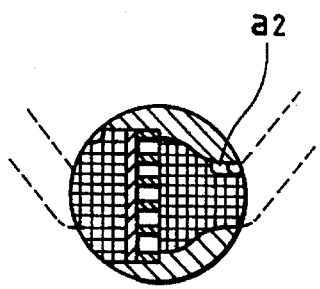
FIG. 10 shows a subsequent stage of the operation of the same component shown in FIG. 5.
Figure 11:
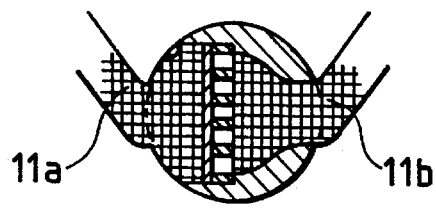
FIG. 11 shows the next stage of the operation of the same component shown in FIG. 5.

The slide bar 3 (or 4) is driven by the hydraulic cylinder 5 (or 6) to move within the through-hole 23 (or 24) in the housing 2 so as to reciprocate between the two states shown in FIG. 4, one being the filtrable state assumed by the first slide bar 3, in which the through-channel 11 in the housing 2 communicates with the filter portion of the first slide bar 3, and the other being the state assumed by the second slide bar 4 for the cleaning or replacement of screen 9, in which the channel portion of the second slide bar 4 is completely exposed to the outside of the housing 2. In the intermediate position shown in FIG. 6, the channel portion of the slide bar 3 (or 4) is sealed and isolated within the through-hole 23 (or 24) in the housing 2.

As shown in FIGS. 1 to 3, the slide bar 3 (or 4) is provided with a material injection channel 33 (or 43) and a first air withdrawing channel 34 (or 44) that are grooves extending axially along the outer surface of the slide bar 3 (or 4), and which function when the slide bar 3 (or 4) is in the intermediate position where the channel portion of the slide bar 3 (or 4) is sealed and isolated within the through-hole 23 (or 24). The material injection channel 33 (or 43) communicates the upstream compartment 31 (or 41) with the inflow channel 11a and the first air withdrawing channel 34 (or 44) communicates the entrance end which is the topmost part of the upstream compartment 31 (or 41) with the outside of the side wall of the housing 2. Similarly, a second air withdrawing channel 36 (or 46) which penetrates the topmost part of the downstream compartment 32 (or 42), i.e., upward from a position right after the breaker plate 10, and which then communicates to the outside of the side wall of the housing 2 is provided as a groove extending axially along the outer surface of the slide bar 3 (or 4) when the slide bar 3 (or 4) is in the above-defined intermediate position.

In the example under discussion, a material withdrawing channel 37 (or 47) that communicates the exit end of the downstream compartment 32 (or 42) with the outside of the side wall of the housing 2 is provided through the housing 2 in the intermediate position of the slide bar 3 (or 4). As already mentioned, the groove-like material injection channel 33 (or 43), the first air withdrawing channel 34 (or 44) and the second air withdrawing channel 36 (or 46) are provided axially along the outer surface of the slide bar 3 (or 4). Although these channels may be provided on the outer surface of the slide bar 3 (or 4) or the inner surface of the through-hole 23 (or 24) in the housing 2, they are better provided on the outer surface of the slide bar 3 (or 4) as shown in FIGS. 1 to 3 in order to assure ease in the manufacture of the apparatus.

The screen changer 1 having the construction described above will operate in the following manner. First suppose that the slide bar 3 (or 4) has been pulled back to the intermediate position by means of hydraulic cylinder 5 (or 6) via piston rod 5a (or 6a) after the cleaning or replacement of screen 9. The openings of the upstream compartment 31 (or 41) and the downstream compartment 32 (or 42) are sealed and isolated within the through-hole 23 (or 24) between the through-channel 11 in the housing 2 and its side wall; in addition, the upstream compartment 31 (or 41) is allowed to communicate with the inflow channel 11a and the outside of the side wall of the housing 2 via the material injection channel 33 (or 43) and the first air withdrawing channel 34 (or 44), respectively; at the same time, the downstream compartment 32 (or 42) is allowed to communicate with the outside of the side wall of the housing 2 via the second air withdrawing channel 36 (or 46) and the material withdrawing channel 37 (or 47). When the material injection channel 33 (or 43) has communicated with the inflow channel 11a, the molten material will flow into the upstream compartment 31 (or 41) from the inflow channel 11a via the material injection channel 33 (or 43).

The molten material which has flowed into the upstream compartment 31 (or 41) pushes the residual air out of said compartment via the first air withdrawing channel 34 (or 44), whereby the upstream compartment 31 (or 41) is progressively filled up with the molten material from bottom to top. Since the first air withdrawing channel 34 (or 44) has its terminal end provided in the topmost part of the upstream compartment 31 (or 41), the residual air can be completely pushed out of the upstream compartment 31 (or 41) and this is verified by the subsequent flowing of the molten material from the housing via the first air withdrawing channel 34 (or 44). The molten material which has flowed into the upstream compartment 31 (or 41) will then pass through the screen 9 and the breaker plate 10 to flow into the downstream compartment 32 (or 42).

The molten material which has flowed into the downstream compartment 32 (or 42) pushes the residual air out of said compartment via the second air withdrawing channel 36 (or 46), whereby the downstream compartment 32 (or 42) is progressively filled up with the molten material from bottom to top. Since the second air withdrawing channel 36 (or 46) has its terminal end provided in the topmost part of the downstream compartment 32 (or 42), the residual air can be completely pushed out of the downstream compartment 32 (or 42) and this is verified by the subsequent flowing of the molten material from the housing via the second air withdrawing channel 36 (or 46). The molten material which has filled up the downstream compartment 32 (or 42) will flow out of the housing via the material withdrawing channel 37 (or 47).

When the molten material which has flowed out of the housing via the material withdrawing channel 37 (or 47) is no longer found to contain any air bubbles, the operator may safely conclude that the residual air has been completely displaced from the channel and filter portions of the slide bar 3 (or 4).

If the molten material to be handled has a low viscosity in the range from 3000 to 1500 poises, the residual air will stay in the upper part of the space which is to be filled up with the molten material and it can be completely displaced by the provision of the first air withdrawing channels 34 and 44 and the second air withdrawing channels 36 and 46 because air bubbles are not entrapped in the molten material. However, if the viscosity of the molten material is lower than 1000 poises, residual air and other foreign matter will enter the molten material and the provision of the material withdrawing channels 37 and 47 becomes necessary. The slide bars 3 and 4 which have thus been emptied of residual air from their channel and filter portions are driven by the hydraulic cylinders 5 and 6 to be pulled back to the filtrable state.

Advantages of the Invention

Being constructed in the manner described on the foregoing pages, the screen changer of the invention offers the following advantages:

(1) The second air withdrawing channels, provided to communicate the topmost parts of the downstream compartments in the filter portions of the slide bars with the outside of the housing, ensure complete displacement of air from the channel and filter portions of the slide bars.

(2) The material withdrawing channels, provided to communicate the downstream compartments in the filter portions of the slide bars with the outside of the housing, ensure complete displacement of air that has been entrapped in the molten material within the channel and filter portions of the slide bars.

(3) The combination of said second air withdrawing channels and said material withdrawing channels ensures complete displacement of not only air from the channel and filter portions of the slide bars but also air that has been entrapped in the molten material within those portions.

(4) After screen cleaning or replacement, air that has occupied those spaces of the channel and filter portions of the slide bars which were emptied of the molten material is completely displaced from the housing in the intermediate position of either slide bar and, hence, the screen, once it is pulled back to the filtrable state, will supply a clean and air-free molten material into a subsequent machine, thereby ensuring that the strand being extruded through a die will not be broken by burst air.

(5) The absence of air from the molten material prevents its oxidation and, hence, the development of burn marks.

(6) As a result, the troubles that have heretofore occurred at each time of screen cleaning or replacement are eliminated and the filtration apparatus and, hence, the extruder it employs, can be operated continuously in a normal way, thereby achieving marked improvements in the operating efficiency of the extruder, the yield of the product and the quality of the product.

What is claimed is:

1. A screen changer comprising:

a housing having a through-channel and through-holes crossing said through-channel;

a plurality of columnar slide bars, each having a filter portion communicable with said through-channel and insertable into one of said through-holes in said housing in a liquid-tight and reciprocating manner, said filter portion having an upstream compartment and a downstream compartment, such that when a molten material enters said housing via an inflow channel to said through-channel, said molten material passes through said filter portion to come out of said housing via an outflow channel from said through-channel;

material injection channels communicating the upstream compartments in said filter portions with said inflow channel;

first air withdrawing channels, disposed along outer surfaces of said slide bars, for communicating the topmost parts of said upstream compartments of said filter portions with the outside of said housing when said filter portions of said slide bars are sealed and isolated within said through-holes in said housing as a result of a movement of said slide bars;

second air withdrawing channels penetrating the topmost parts of said downstream compartments of said filter portions of said slide bars, communicating with the outer surfaces of said slide bars and extending along the outer surfaces of said slide bars to communicate with the outside of said housing when said filter portions are sealed and isolated within said through-holes in said housing as a result of said movement of said slide bars; and material withdrawing channels in said housing, for communicating the downstream compartments in said filter portions of said slide bars with the outside of said housing when said filter portions are sealed and isolated within said through-holes in said housing as a result of said movement of said slide bars.

* * * * *